US011429401B2

(12) United States Patent
Busekrus et al.

(10) Patent No.: US 11,429,401 B2
(45) Date of Patent: Aug. 30, 2022

(54) NAVIGATING A USER INTERFACE OF A UTILITY METER WITH TOUCH-BASED INTERACTIONS

(71) Applicant: Landis+Gyr Innovations, Inc., Alpharetta, GA (US)

(72) Inventors: Doug Busekrus, Lafayette, IN (US); Gerry VanHorn, West Lafayette, IN (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/809,293

(22) Filed: Mar. 4, 2020

(65) Prior Publication Data

US 2021/0279080 A1  Sep. 9, 2021

(51) Int. Cl.
*G06F 9/451* (2018.01)
*G06Q 50/06* (2012.01)

(52) U.S. Cl.
CPC ............. *G06F 9/451* (2018.02); *G06Q 50/06* (2013.01)

(58) Field of Classification Search
CPC ............................... G06F 9/451; G06Q 50/06
See application file for complete search history.

(56) References Cited

U.S. PATENT DOCUMENTS

| 6,615,147 | B1 | 9/2003 | Jonker et al. |
| 6,816,360 | B2 | 11/2004 | Brooksby et al. |
| 7,135,850 | B2 | 11/2006 | Ramirez |
| 7,469,190 | B2 | 12/2008 | Bickel |
| 7,693,670 | B2 | 4/2010 | Durling et al. |

(Continued)

FOREIGN PATENT DOCUMENTS

| WO | 2018072030 | 4/2018 |
| WO | 2018083902 | 5/2018 |
| WO | 2019026791 | 2/2019 |

OTHER PUBLICATIONS

Y. T. Park, P. Sthapitand J. Pyun, "Smart digital door lock for the home automation," TENCON 2009—2009 IEEE Region 10 Conference, Singapore, 2009, pp. 1-6, doi: 10.1109/TENCON.2009.5396038. (Year: 2009).*

(Continued)

*Primary Examiner* — Jeremy L Stanley
(74) *Attorney, Agent, or Firm* — Kilpatrick Townsend & Stockton LLP

(57) ABSTRACT

Techniques for detecting interactions with a utility meter. In an example, a method transitions from a locked user input state into an unlocked user input state. While in the unlocked user input state, the method performs operations, including displaying, on a display of the utility meter, a menu that includes objects. The operations further include receiving, from an accelerometer, an acceleration measurement that represents three-dimensional movement. The operations further include comparing the acceleration measurement to an expected user input. The expected user input is associated with an interaction with a selected surface of the utility meter and is based on the displayed menu. The operations can further include when the acceleration measurement corresponds to the expected user input, updating the displayed menu to indicate a user selection of a selected object on the displayed menu and updating the display by navigating the menu to indicate the selected object.

18 Claims, 6 Drawing Sheets

(56) References Cited

U.S. PATENT DOCUMENTS

| | | | |
|---|---|---|---|
| 7,886,166 B2* | 2/2011 | Shnekendorf | H02J 3/14 |
| | | | 713/310 |
| 7,990,806 B2 | 8/2011 | Chen | |
| 8,004,933 B2 | 8/2011 | Iseli | |
| 8,121,741 B2 | 2/2012 | Taft et al. | |
| 8,223,466 B2 | 7/2012 | Roscoe | |
| 8,305,231 B2* | 11/2012 | Fujii | G01F 15/063 |
| | | | 340/870.02 |
| 8,322,215 B2* | 12/2012 | Lakich | G01R 22/066 |
| | | | 73/514.16 |
| 8,326,554 B2 | 12/2012 | Caird | |
| 8,635,036 B2 | 1/2014 | Pamulaparthy et al. | |
| 8,754,634 B2 | 6/2014 | Chamarti et al. | |
| 8,812,979 B2* | 8/2014 | Khanke | G06F 21/105 |
| | | | 715/810 |
| 8,830,083 B2 | 9/2014 | LaFrance et al. | |
| 8,854,217 B2 | 10/2014 | Brown et al. | |
| 8,947,246 B2 | 2/2015 | Aiken | |
| 8,978,443 B2 | 3/2015 | Ramirez | |
| 8,996,144 B2 | 3/2015 | LaFrance et al. | |
| 9,164,135 B2 | 10/2015 | Cs et al. | |
| 9,304,014 B2 | 4/2016 | Komati et al. | |
| 9,341,686 B2 | 5/2016 | Deak et al. | |
| 9,476,740 B2 | 10/2016 | Zigovszki et al. | |
| 9,557,392 B2 | 1/2017 | Schuhl et al. | |
| 9,602,895 B2 | 3/2017 | Bowling et al. | |
| 9,671,254 B2 | 6/2017 | Zigovszki et al. | |
| 9,887,051 B2 | 2/2018 | LaFrance et al. | |
| 9,891,088 B2 | 2/2018 | Zigovszki et al. | |
| 10,133,393 B2* | 11/2018 | Yu | G06F 3/016 |
| 10,240,961 B2 | 3/2019 | Cheng et al. | |
| 10,254,315 B2 | 4/2019 | Higashi et al. | |
| 10,295,578 B2 | 5/2019 | Higashi et al. | |
| 10,430,263 B2* | 10/2019 | Polar Seminario | |
| | | | G06F 11/1441 |
| 10,690,519 B2* | 6/2020 | Lee | G01D 5/145 |
| 10,771,532 B2* | 9/2020 | Polar Seminario | G01D 4/004 |
| 2004/0034603 A1* | 2/2004 | Hastings | G07F 15/00 |
| | | | 705/63 |
| 2005/0017874 A1* | 1/2005 | Lightbody | H04Q 9/02 |
| | | | 340/870.02 |
| 2005/0246295 A1* | 11/2005 | Cameron | G01D 4/004 |
| | | | 705/412 |
| 2006/0244421 A1* | 11/2006 | Narendran | H02J 7/342 |
| | | | 320/132 |
| 2007/0174467 A1* | 7/2007 | Ballou | H04L 67/2842 |
| | | | 709/227 |
| 2007/0222765 A1* | 9/2007 | Nyyssonen | G06F 1/169 |
| | | | 345/173 |
| 2008/0088476 A1* | 4/2008 | Wang | G06Q 50/06 |
| | | | 340/870.02 |
| 2009/0265123 A1* | 10/2009 | Porter | G01D 4/006 |
| | | | 702/62 |
| 2010/0238983 A1* | 9/2010 | Banhegyesi | H04B 10/25891 |
| | | | 375/214 |
| 2011/0117970 A1* | 5/2011 | Choi | H04M 1/67 |
| | | | 455/566 |
| 2012/0053472 A1* | 3/2012 | Tran | A61B 5/7282 |
| | | | 600/509 |
| 2012/0056755 A1* | 3/2012 | Hanft | H04Q 9/00 |
| | | | 340/870.07 |
| 2012/0060606 A1* | 3/2012 | Lakich | G01R 11/24 |
| | | | 73/514.16 |
| 2012/0078547 A1* | 3/2012 | Murdoch | G01D 4/004 |
| | | | 702/62 |
| 2012/0116602 A1* | 5/2012 | Vaswani | H04L 63/10 |
| | | | 700/295 |
| 2012/0242498 A1* | 9/2012 | Ree | G01D 4/002 |
| | | | 340/870.02 |
| 2013/0095459 A1* | 4/2013 | Tran | G09B 19/00 |
| | | | 434/247 |
| 2013/0110426 A1* | 5/2013 | Van Olst | G06F 1/1626 |
| | | | 702/62 |
| 2013/0204450 A1* | 8/2013 | Kagan | H04L 67/06 |
| | | | 700/291 |
| 2013/0282624 A1* | 10/2013 | Schackmuth | G01R 19/165 |
| | | | 705/412 |
| 2014/0002239 A1* | 1/2014 | Rayner | A45C 13/24 |
| | | | 340/5.61 |
| 2014/0180613 A1* | 6/2014 | Banhegyesi | G01R 22/10 |
| | | | 702/61 |
| 2015/0316944 A1* | 11/2015 | Thellend | H02J 13/00001 |
| | | | 700/292 |
| 2016/0119789 A1* | 4/2016 | Hu | H04W 12/08 |
| | | | 455/411 |
| 2016/0225562 A1* | 8/2016 | Franks | H02H 3/08 |
| 2016/0301990 A1* | 10/2016 | Tang | G06F 9/44 |
| 2016/0320763 A1* | 11/2016 | Jorgensen | G08C 17/02 |
| 2017/0180137 A1* | 6/2017 | Spanier | G06F 8/654 |
| 2017/0285768 A1* | 10/2017 | Bruwer | G06F 3/0362 |
| 2018/0052008 A1* | 2/2018 | Maman | G06K 9/2027 |
| 2018/0073910 A1 | 3/2018 | Deak et al. | |
| 2018/0106640 A1 | 4/2018 | Padrones et al. | |
| 2018/0114385 A1* | 4/2018 | Gullicksen | G07C 9/00571 |
| 2018/0212687 A1* | 7/2018 | Westmeyer | H04B 10/85 |
| 2018/0217732 A1* | 8/2018 | Wang | G06F 3/0482 |
| 2018/0373388 A1* | 12/2018 | Yang | G06F 1/3287 |
| 2019/0041439 A1 | 2/2019 | Brown | |
| 2019/0094329 A1 | 3/2019 | Minich | |
| 2019/0101411 A1 | 4/2019 | Davis et al. | |
| 2019/0219618 A1 | 7/2019 | Davis et al. | |
| 2020/0041307 A1* | 2/2020 | Kagan | G01D 4/004 |
| 2020/0162503 A1* | 5/2020 | Shurtleff | G06F 11/00 |
| 2020/0191606 A1* | 6/2020 | Banhegyesi | G01D 4/004 |

OTHER PUBLICATIONS

Disclosed Anonymously, "Interactive Menus", IP.com Prior Art Database Technical Disclosure, Sep. 4, 2018, pp. 1-21 (Year: 2018).*

A. Depari, C. M. De Dominicis, A. Flammini, E. Sisinni, L. Fasanotti and P. Gritti, "Using smartglasses for utility-meter reading," 2015 IEEE Sensors Applications Symposium (SAS), Zadar, 2015, pp. 1-6, doi: 10.1109/SAS.2015.7133649. (Year: 2015).*

Disclosed anonymously, "A module display current & historical utility meter data on a standard TV set via video displays", IP.com prior art database technical disclosure, Dec. 21, 2007, pp. 1-3 (Year: 2007).*

* cited by examiner

NAVIGATING A USER INTERFACE OF A UTILITY METER WITH TOUCH-BASED INTERACTIONS

TECHNICAL FIELD

This disclosure relates generally to metering systems, or utility meters, and more specifically to utility meters that detect physical, or touch-based, interactions with a body or a surface of the utility meter and navigate a menu of a user interface based on the detected interactions.

BACKGROUND

Utility meters such as those used to measure electricity and gas consumption can require configuration or have settings that can be adjusted. For example, a user may wish to change locale-specific settings or communication settings.

But interacting with a utility meter to perform such a configuration can be cumbersome and can require additional buttons to be added to an exterior of the meter. Hence, new solutions are needed to facilitate easier configuration of utility meters.

SUMMARY

Certain aspects and features include techniques for detecting interactions with a utility meter. In an aspect, a method transitions from a locked user input state into an unlocked user input state. While in the unlocked user input state, the method performs operations. The operations include displaying, on a display of the utility meter, a menu that includes objects. The operations further include receiving, from an accelerometer, an acceleration measurement that represents three-dimensional movement. The operations further include comparing the acceleration measurement to an expected user input. The expected user input is associated with an interaction with a selected surface of the utility meter and is based on the displayed menu. The operations can further include when the acceleration measurement corresponds to the expected user input, selecting an object of the plurality of objects.

In another aspect, a utility meter transitions from a locked user input state into an unlocked user input state. While in the unlocked user input state, the utility meter performs operations. The operations include displaying, on a display of the utility meter, a menu that includes objects. The operations further include receiving, from an accelerometer, an acceleration measurement that represents three-dimensional movement. The operations further include comparing the acceleration measurement to an expected user input. The expected user input is associated with an interaction with a selected surface of the utility meter and is based on the displayed menu. The operations can further include when the acceleration measurement corresponds to the expected user input, updating the displayed menu to indicate a user selection of the object and updating the display by navigating the menu to indicate the selected object.

In another aspect, a non-transitory computer-readable storage medium stores computer-executable program instructions. When executed by a processing device, the instructions cause the processing device to perform operations. The operations include transitioning from a locked user input state into an unlocked user input state. The operations include, while in the unlocked user input state, displaying, on a display of the utility meter, a menu that includes objects. The operations further include receiving, from an accelerometer, an acceleration measurement that represents three-dimensional movement. The operations further include comparing the acceleration measurement to an expected user input. The expected user input is associated with an interaction with a selected surface of the utility meter and is based on the displayed menu. The operations can further include when the acceleration measurement corresponds to the expected user input, selecting an object from the plurality of objects on the displayed menu.

These illustrative examples are mentioned not to limit or define the disclosure, but to provide examples to aid understanding thereof. For example, the aspects discussed above may be implemented as a method, via operations performed by a utility meter, or via instructions stored on a non-transitory computer-readable medium. Additional examples and further description are provided in the Detailed Description.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Certain aspects relate to utility meters with improved human-computer-interaction relative to previous solutions. In particular, disclosed utility meters can receive and process inputs to a user interface by detecting one or more physical, e.g., touch-based, interactions with a body, surface, or other part of the meter. Interactions can include taps, swipes, and drags. Using these interactions, a user (for example, an engineer from a utility company) can change meter configuration parameters relating to communications, diagnostics, load, and the like.

More specifically, disclosed utility meters receive measurements from a movement sensor such as an accelerometer and compare the measurements to an expected user input. When the measurements match the expected user input, the utility meter processes the measurements as a corresponding interaction. In contrast, when no such match is found, for example when the movement is caused by other sources, the utility meter does not consider the movement. Interactions can be received anywhere on the utility meter such as a surface, a housing, or a cover. In some cases, interactions on different parts of the utility meter can signify different commands such as navigating forward or backward within a menu of a user interface.

Figure 1:
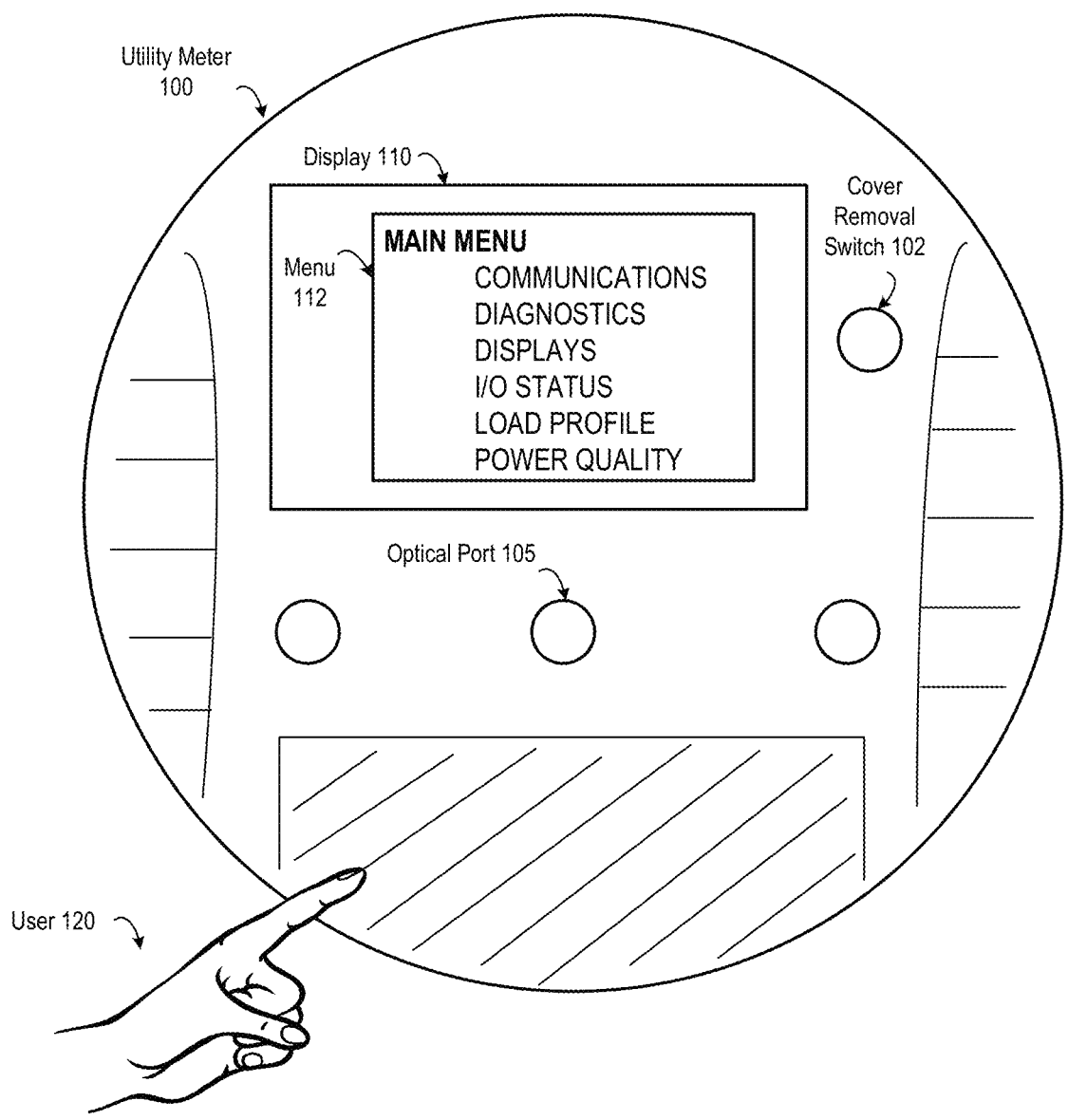
FIG. 1 depicts a front view of an exemplary utility meter, according to an aspect of the present disclosure.

Turning now to the Figures, FIG. 1 depicts a front view of an exemplary utility meter, according to an aspect of the present disclosure. FIG. 1 depicts utility meter 100, which includes cover removal switch 102; optical port 105; display 110 including menu 112. FIG. 1 also depicts user 120. In the example depicted by FIG. 1, utility meter 100 detects interactions on a surface or enclosure of utility meter 100 and processes the interactions to navigate objects displayed on menu 112.

Display 110 can be any kind of display such as a Liquid Crystal Display (LCD), Light Emitting Diode (LED) display, touch-screen, or other device operable to display information such as menus. Display 110 displays menu 112, which includes objects "communications," "diagnostics," "displays," "I/O status," "load profile," and "power quality." A user, for example, an installer, engineer, or utility worker can configure utility meter 100 by navigating menu 112.

Utility meter 100 can exist in different states, including a locked user input state and an unlocked user input state. In the locked user input state, utility meter 100 does not consider interactions from a user. By contrast, in the unlocked user input state, utility meter 100 identifies and processes interactions from a user. As depicted, utility meter 100 is shown in unlocked user input state. User 120 has navigated to a "main menu" as depicted in menu 112 and displayed on display 110. In some cases the locked user input state is the default state.

Entering the unlocked state can be accomplished by performing one of several different actions. For example, utility meter 100 transitions to the unlocked user input state when cover removal switch 102 indicates that a cover of the utility meter is removed. In another example, a utility meter transitions to the unlocked user input state when utility meter 100 determines that optical connection has been established between optical port 105 of the utility meter and an external device (e.g., a diagnostic device). Optical port 105 can use the American National Standards Institute (ANSI) C12.18, C12.18, or other protocol. In yet another example, utility meter 100 transitions to the unlocked user input state upon detecting a magnetic signal at a specific location (e.g., on a side) of utility meter 100.

In another aspect, utility meter 100 include other communications ports. Examples of communication ports include an Ethernet port, a Universal Asynchronous Receiver/Transmitter (UART) or other serial port. Further, utility meter 100 can include wireless capability, including WiFi, mesh, Bluetooth, or near-field communication (NFC). Further, utility meter 100 can be unlocked or locked remotely via a device that connects with utility meter 100 via these communication techniques. For example, a device connected via Ethernet could unlock utility meter 100. In another example, a mobile device with NFC or Bluetooth, when placed in proximity to utility meter 100, can unlock utility meter 100.

In some cases, utility meter 100 can be unlocked by an interaction. Such an interaction can be identical to or different from the interaction used to navigate a menu or select items. In an example, utility meter 100 receives an additional accelerometer measurement from the movement sensor. Utility meter 100 compares the additional accelerometer measurement to an expected user unlocked input, which represents expected movement associated with an interaction that unlocks the meter.

Further, to help ensure that utility meter 100 is not easily unlocked or cannot be unlocked by someone who is not authorized to do so, various unlocked techniques discussed herein can be combined in a sequence. For example, utility meter 100 can require a sequence that includes actuation of cover removal switch 102 with an establishment of a secure connection via optical port 105 to enter the unlocked user input state.

In an example of a use case, utility meter 100 is in the locked user input state, in which user inputs are not processed. A user of utility meter 100 unlocks the meter by connecting an external device with an optical cable or placing a magnet on a specific part of the meter. Utility meter 100 transitions from the locked user input state to the unlocked user input state, becoming ready for interactions. A menu is displayed on display 110, facilitating navigation of menu 112. After a predetermined amount of time during which no activity is detected, utility meter 100 can return to the locked user input state.

In some cases, utility meter 100 is a standalone meter. In other cases, the functionality of utility meter 100 can be implemented as a supplemental device that can attach to a legacy meter that was not originally designed for electronic measurement of resource consumption or communications capabilities. Such a supplemental device can obtain metering information by interfacing with a mechanical dial. In this manner, the supplemental device can provide more sophisticated metering capabilities than previously available. When an interaction is detected by the supplemental device, any connections with the legacy meter may be disconnected for a period of time.

Utility meter 100 can also perform standard metering functionality such as measuring resource consumption, hot socket detection, tampering detection, remote shutoff, etc. Utility meter 100 is depicted as substantially circular, but can be any shape, for example, square or rectangular.

Figure 2:
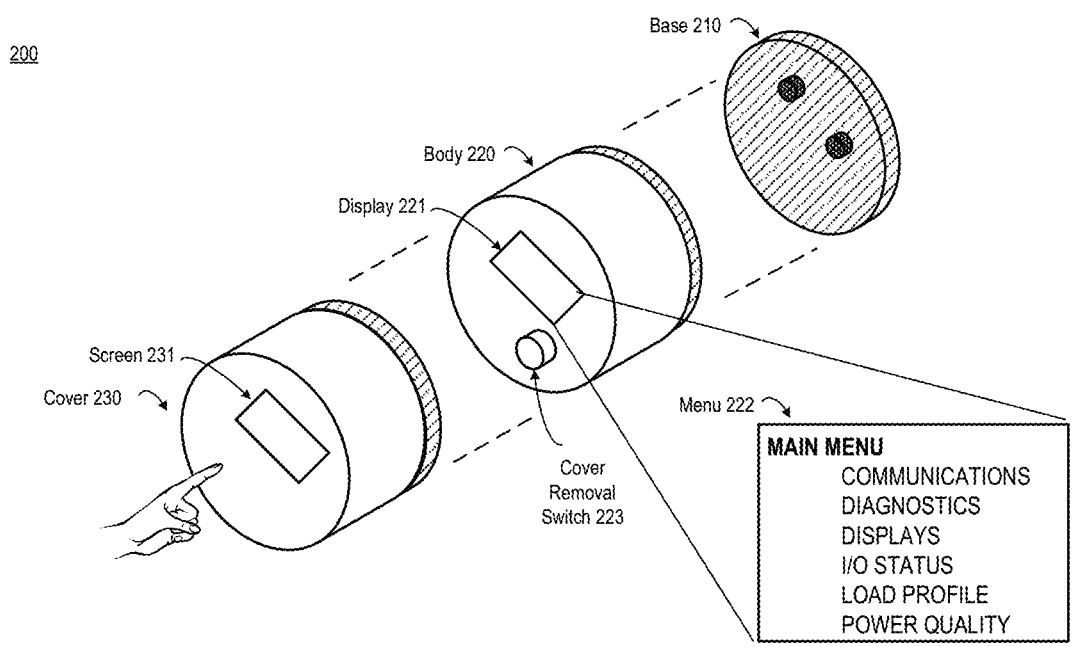
FIG. 2 depicts an exploded view of an exemplary utility meter, according to an aspect of the present disclosure.

FIG. 2 depicts an exploded view of an exemplary utility meter, according to an aspect of the present disclosure. FIG. 2 depicts utility meter 200, which includes base 210, body 220, and cover 230. Utility meter 200 is an example of utility meter 100. As can be seen, cover 230 is shown removed from body 220, which is removed from base 210.

Body 220 includes circuitry to perform metering and other functions. Body 220 includes display 221 and is removable from base 210, for example, for servicing or replacement. Cover 230 can be attached to body 220 or over body 220 to protect body 220 from weather and other elements, and from tampering. Cover 230 has a transparent screen 231 that protects display 221, but also enables display 221 and menu 222 to be viewed from outside of cover 230.

Utility meter 200 can detect interactions with or without cover 230 attached to body 220. For example, a user may remove cover 230 to perform configuration or diagnostics. When cover 230 is removed, cover removal switch 223 detects the removal and in some cases, causes utility meter 200 to automatically transition to the unlocked user input state. In this state, body 220 can still detect interactions. In other cases, when cover 230 is placed on top of body 220, utility meter 200 automatically transitions to the locked user input state, but can transition back to the unlocked user input state when an event occurs such as a connection of an optical connection or detection of an external magnet.

Figure 3:
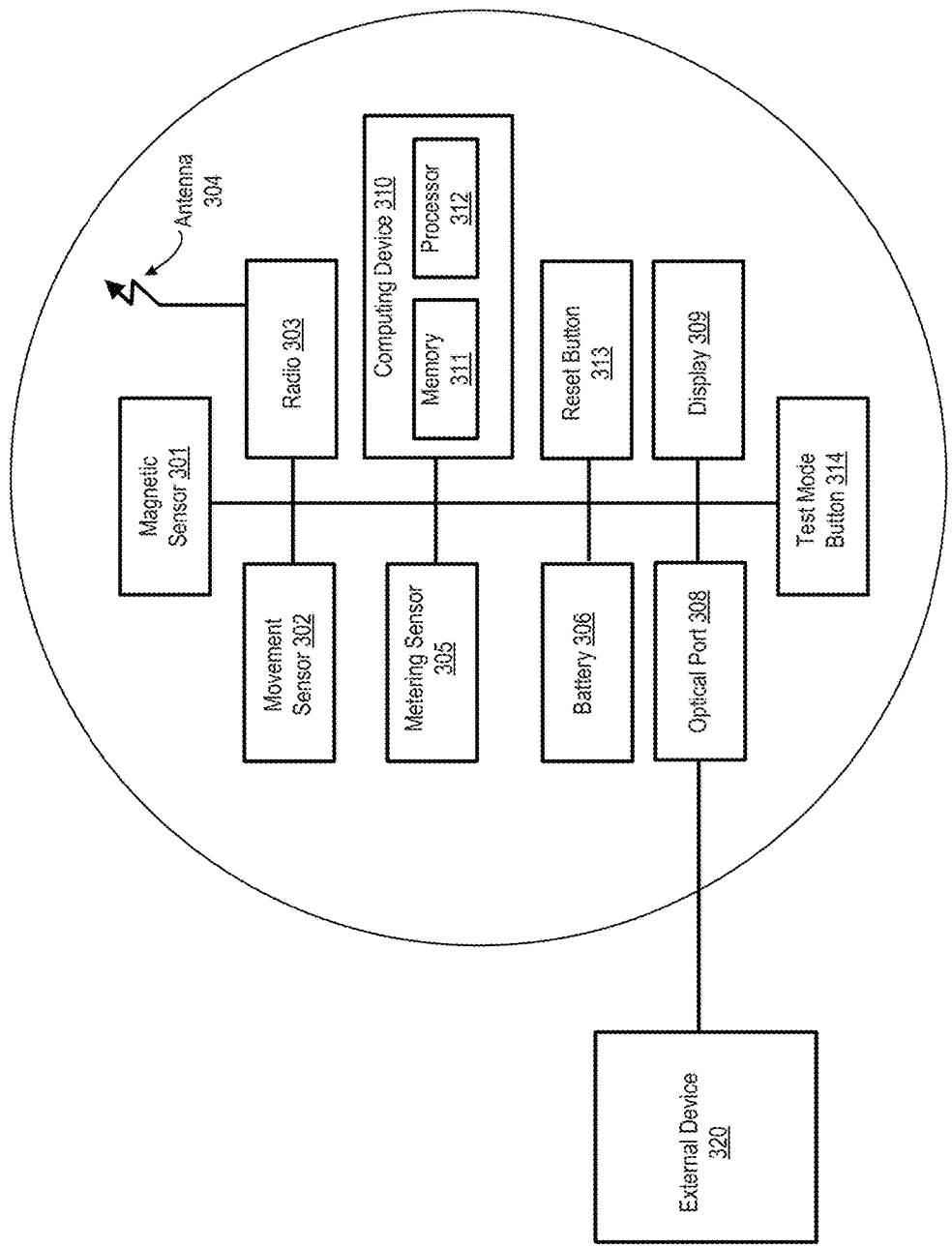
FIG. 3 is a schematic of an exemplary utility meter, according to an aspect of the present disclosure.

FIG. 3 is a block diagram of an exemplary utility meter, according to an aspect of the present disclosure. FIG. 3 depicts utility meter 300, which includes one or more of magnetic sensor 301, movement sensor 302, radio 303, antenna 304, metering sensor 305, battery 306, optical port 308, display 309, computing device 310 (which includes memory 311 and processor 312), reset button 313, and test mode button 314. Utility meter 300 is an example implementation of utility meter 100 or utility meter 200. As depicted, utility meter 300 is connected to external device 320 via the optical port 308.

Magnetic sensor 301 is a sensor that a can detect a presence of or a change in magnetic field. Magnetic sensor 301 outputs a magnetic sensor signal that indicates a strength of a detected magnetic field. Examples of suitable sensors include Hall Effect sensors or Tunnel Magnetoresistive sensors. Magnetic sensor 301 can be positioned anywhere within the confines of the meter, for example, within body 220. In an example, a user places a magnet near a specific part of the utility meter, for example, on a side or a top of the utility meter. Magnetic sensor 301 outputs a signal that is indicative of a presence of magnetic field. The signal causes utility meter 300 to transition from locked user input state to the unlocked user input state. In some cases, utility meter 300 waits until a magnetic field of a minimum strength has been present for a time threshold, then transitions to the unlocked user input state.

Movement sensor 302 can be any sensor that can output a measurement of movement or vibration. In some cases, movement sensor 302 outputs separate measurements of movement in one or more dimensions, e.g., (the x, y, and/or z directions). Examples of suitable sensing devices are seismometers, accelerometers, tilt switches, and other kinds of vibration sensors. Movement sensor 302 can be analog or digital. In some cases, an analog movement sensor or accelerometer can be used, which outputs a voltage, current, or frequency that is proportional to acceleration. In this case, utility meter 300 samples the voltage to obtain a digital measurement. A digital movement sensor can output a digital signal or sample representing an ordered triple (x, y, z) with a direction. Movement sensor 302 can be mounted inside or outside utility meter 300. In some cases, movement sensor 302 can be located in a separate enclosure from utility meter 300 and can communicate with utility meter 300 wirelessly. A user can interact with the separate enclosure.

Radio 303 can transmit and/or receive wireless communications with an external device or network. Radio 303 is connected to antenna 304. Examples of wireless networks include personal area networks and mesh networks. Metering sensor 305 outputs metering information such as electricity usage, flow rate, pressure, etc. Computing device 310 receives the information from metering sensor 305 and calculates consumption, performs calculations, and/or transmits the information or calculations to an external or head-end system. Utility meter 300 can communicate with external devices such as head-end systems and other meters via radio 303. Radio 303 can communicate wirelessly via antenna 304. For example, radio 303 can receive messages from computing device 310 and transmit the messages to a head-end system. Radio 303 can transmit events that are logged by utility meter 300, for example, transitions from the unlocked user input state to the locked user input state or vice versa. Additional examples of events include menus that are navigated by the user using interactions.

Computing device 310 includes a processor 312 communicatively coupled to memory 311. The processor 312 executes computer-executable program code stored in a memory 311, accesses data stored in the memory, or both. Examples of the processor 312 are microprocessor, an application-specific integrated circuit ("ASIC"), a field-programmable gate array ("FPGA"), signal processor, controller, or any other suitable processing device. The processor 312 can include any number of processing devices or cores, including a single processing device. The functionality of the computing device may be implemented in hardware, software, firmware, or a combination thereof.

The memory 311 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language. The computing device 310 executes computer-executable program instructions, that configure the processor 312 to perform one or more of the operations described herein. For example, the computer-executable program instructions, can cause the processor to perform the operations described in FIG. 4.

Utility meter 300 can include a battery 306. Utility meter 300 can be powered by battery 306 or by a mains electrical connection. Optical port 308 can receive and transmit optical signals such as infrared or other wavelengths. Via optical port 308, utility meter 300 can establish a connection with external device 320. Examples of external device 320 include a tool or a diagnostic instrument. Display 309 can be a LCD, LED, touch-screen or other device operable to display information about the computing device 310. In some cases, utility meter 300 includes reset button 313. Pressing reset button 313 performs a reset of accumulated consumption data for a particular demand interval. In some cases, utility meter 300 includes test mode button 314. By pressing test mode button 314, a user can cause utility meter 300 to enter a test mode in which a test sequence is performed. In some cases, entering a test mode can cause the meter to enter the unlocked user input state.

The computing device 310 may also include a number of additional external or internal devices, such as input or output devices. An I/O interface can receive input from input devices or provide output to output devices. One or more busses are also included in the computing device 310. The bus communicatively couples one or more components of computing device 310 and/or utility meter 300.

Figure 4:
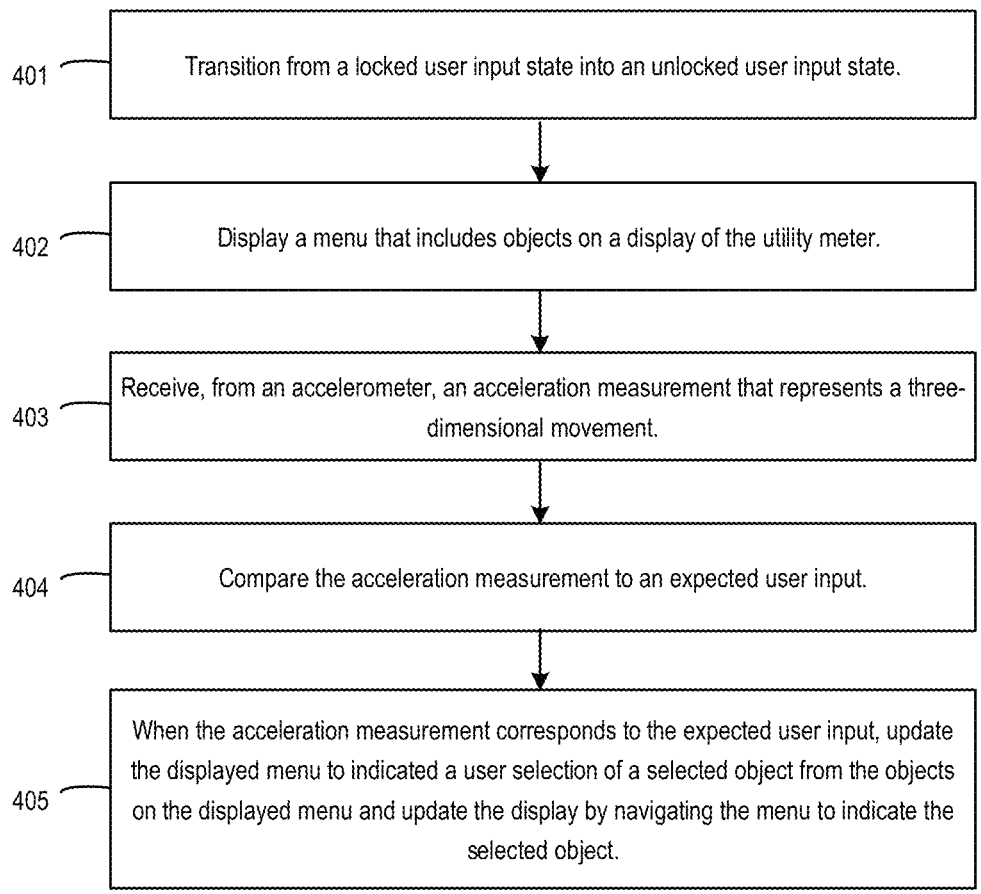
FIG. 4 is a flowchart illustrating an exemplary process for reporting resource flow, according to an aspect of this disclosure.

FIG. 4 is a flowchart illustrating an exemplary process 400 for reporting resource flow, according to an aspect of this disclosure. For illustrative purposes, process 400 is discussed with respect to utility meter 300 and computing device 310. But process 400 can be implemented by other types of meters. Further, while blocks 401-405 are discussed in order, any of blocks 401-405 can be executed out-of-order and/or skipped.

At block 401, process 400 involves transitioning from a locked user input state into an unlocked user input state. When in the unlocked user input state, utility meter 300 identifies and processes interactions. Blocks 401-405 operate in the unlocked user input state.

In an aspect, utility meter 300 can create a model of detected movements upon transitioning to the unlocked user input state. The model can be used a baseline level of movement, representing noise. Utility meter 300 can remove this baseline level of movement from a future measurement of movement (e.g., as obtained at block 403).

At block 402, process 400 involves displaying a menu that includes objects on a display of the utility meter. For illustration purposes, process 400 is also discussed in conjunction with FIG. 5, which depicts examples of menus and objects that can be displayed by a utility meter.

Figure 5:
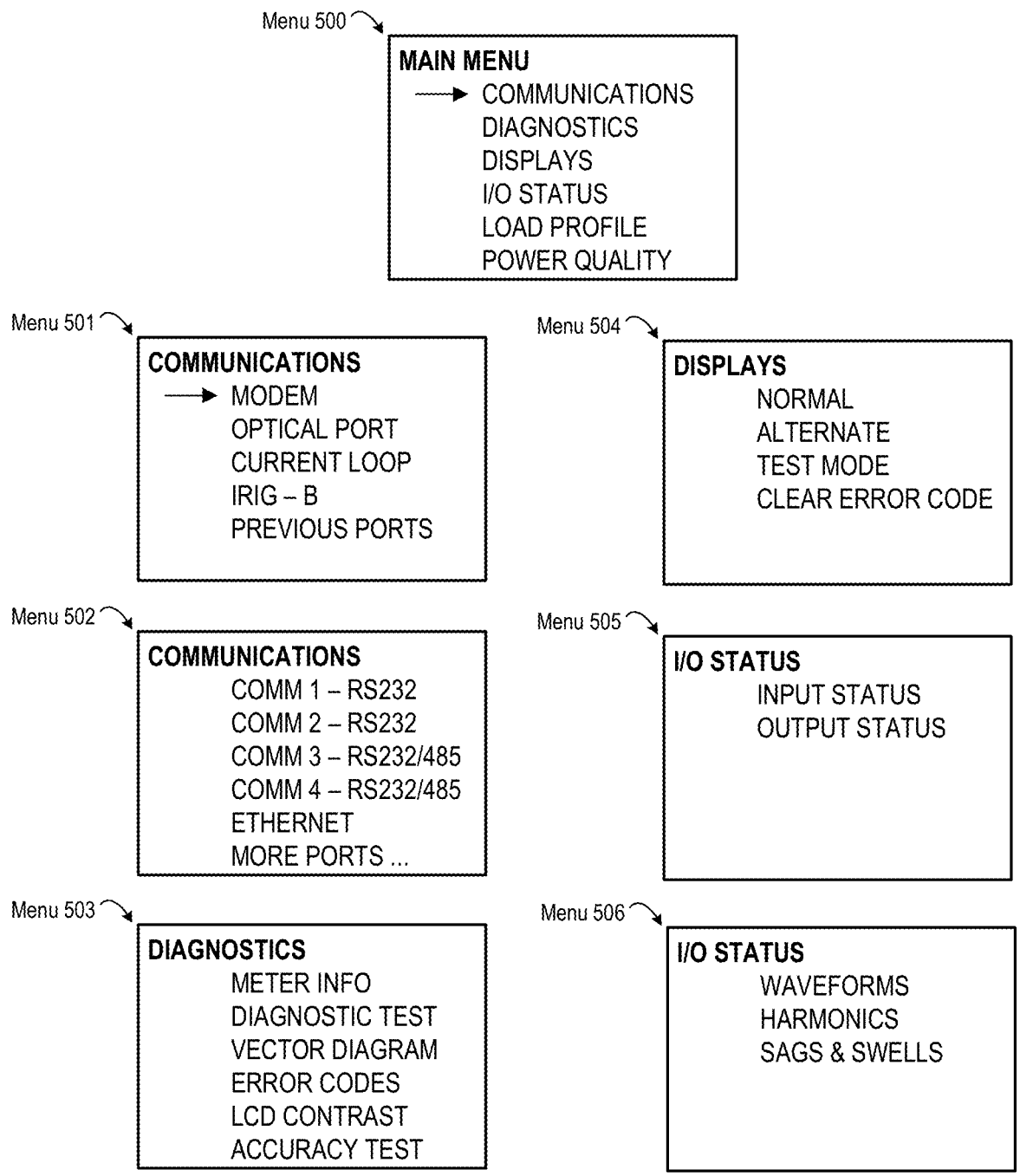
FIG. 5 depicts examples of menus used in an exemplary utility meter, according to an aspect of the present disclosure.

FIG. 5 depicts examples of menus used in an exemplary utility meter, according to an aspect of the present disclosure. FIG. 5 includes menus 500-506. Each of menu 500-506 includes various objects that can be selected. For example, menu 500 includes objects "COMMUNICATIONS," "DIAGNOSTICS," "DISPLAYS," "I/O STATUS," "LOAD PROFILE," and "POWER QUALITY." As depicted, menus 500-506 are related. For example, selecting the "COMMUNICATIONS" object from menu 500 results in menu 501, entitled "COMMUNICATIONS" being displayed, with various objects including "MODEM," "OPTICAL PORT," and so forth. Menus 502 and 503 represent additional objects available under "COMMUNICATIONS." Menu 504 corresponds to the selection of "DISPLAYS" under menu 500. Menus 505 and 506 represent options available after the selection of "DISPLAYS" under menu 500. Continuing the example, utility meter 300 displays menu 500 on display 309.

Returning to FIG. 4, at block 403, process 400 involves receiving, from an accelerometer, an acceleration measurement that represents a three-dimensional movement. When in unlocked user input state, utility meter 300 periodically receives samples from the movement sensor 302. Utility meter can analyze a fixed number of samples of measurements from movement sensor 302, for example, a fixed number of samples, or samples corresponding to a fixed window of time, e.g., 500 milliseconds. Samples received from movement sensor 302 can be digital samples. If movement sensor 302 outputs analog values, then utility meter 300 can sample the analog values at a sampling rate.

At block 404, process 400 involves comparing the acceleration measurement to an expected user input. Utility meter 300 compares the samples to an expected user input. The expected user input is associated with one or more acceleration measurements or range of acceleration measurements that correspond to a user interaction with a selected surface of the utility meter and can be represented by a fixed number of samples or time window of samples. Utility meter 300 can acknowledge an interaction with an audible beep or via a notification on display 309. Examples of notifications include illuminating one or more shapes, numbers, digits, letters, or segments of the display.

Different methods can be used to compare the acceleration measurement with the expected user input. For example, standard signal processing techniques can be used such as correlation. Utility meter 300 can perform a cross-correlation between samples of the acceleration measurement and samples of the expected movement. When the cross-correlation is greater than a threshold, the utility meter identifies the acceleration measurement as the expected user input (rather than another type of movement such as a vibration, tamper attempt, passing car, etc.).

Utility meter 300 can maintain a database or data structure that includes different known patterns such as a tap, a tamper attempt, or a vibration due to a car. Utility meter 300 can also identify acceleration measurements that are periodic in nature and distinguish such measurements from an expected user input. An acceleration measurement can be periodic for different reasons, such as when a utility meter is installed on a pole or other mount that sways in the wind.

In some cases, computing device 310 uses machine-learning techniques to compare the acceleration measurement with the expected user input. The machine learning model can be trained by providing different sensor outputs with ground truths, e.g., labeled as corresponding to an interaction, not corresponding to a tap interaction, or corresponding to another event such as a passing vehicle or a tampering attempt. Training can be done before utility meter 300 is deployed and/or can be updated over time. For example, computing device 310 can provide the sensor data received from movement sensor 302 to the machine learning model. In turn, the model outputs a determination of whether the movement is representative of an interaction with utility meter 300.

More specifically, using machine learning or other algorithmic techniques, computing device 310 can differentiate an interaction from other detected movement by distinguishing a magnitude, direction, and pattern of the interaction. For example, a passing vehicle would have a lower magnitude and a more diffuse signal as compared to a user interaction, which can be reflected by a sharp, intense strike from a tap. Similarly, if the metering system were hit by a ball or another object, the resulting measurements can show a larger magnitude than a user interaction.

Three dimensions of movement can be detected and processed by computing device 310. Each type of interaction can create a respective expected user input, which is a signature or pattern that can be characterized and can identify from where the interaction originates. Further, specific patterns can be selected such that a likelihood of the patterns randomly occurring in a metering environment is not likely.

At block 405, process 400 involves, when the acceleration measurement corresponds to the expected user input, updating the displayed menu to indicate a user selection of a selected object from the objects on the displayed menu and updating the display by navigating the menu to indicate the selected object. For example, referring again to FIG. 5, utility meter 300 updates display 110 to display menu 501. Optionally, an arrow can depict a currently selected option. Other emphasis can be used such as bold or underlined text.

Certain aspects can further distinguish interactions made on different locations of the meter, e.g., a tap on a left-hand side versus a tap on a right-hand side of the meter. For example, a user may navigate forward (e.g., select options) and backward (e.g., return to a previous menu) as desired. In some cases, such navigation can be accomplished by use of interactions on more than one side of the meter. In an example, left, center, and right sides of the meter are used. For example, a tap on a right side of a meter indicates a movement forward in the menu system. Conversely, a tap on a left side of the meter indicates a desire to return to a previous menu. A tap in a center of the front face of the meter system indicates a selection.

To support different interactions, the utility meter can store and refer to an expected user measurement for each interaction. Continuing the example above, the utility meter can store a first expected user measurement for a left-side tap, a second expected user measurement for a right-side tap, and a third expected user measurement for a center-tap. In some cases, machine learning techniques can be employed. For example, the utility meter can train a machine learning model to distinguish between the different interactions or access a pre-trained model. The utility meter can then use the trained model to distinguish interactions.

Figure 6:
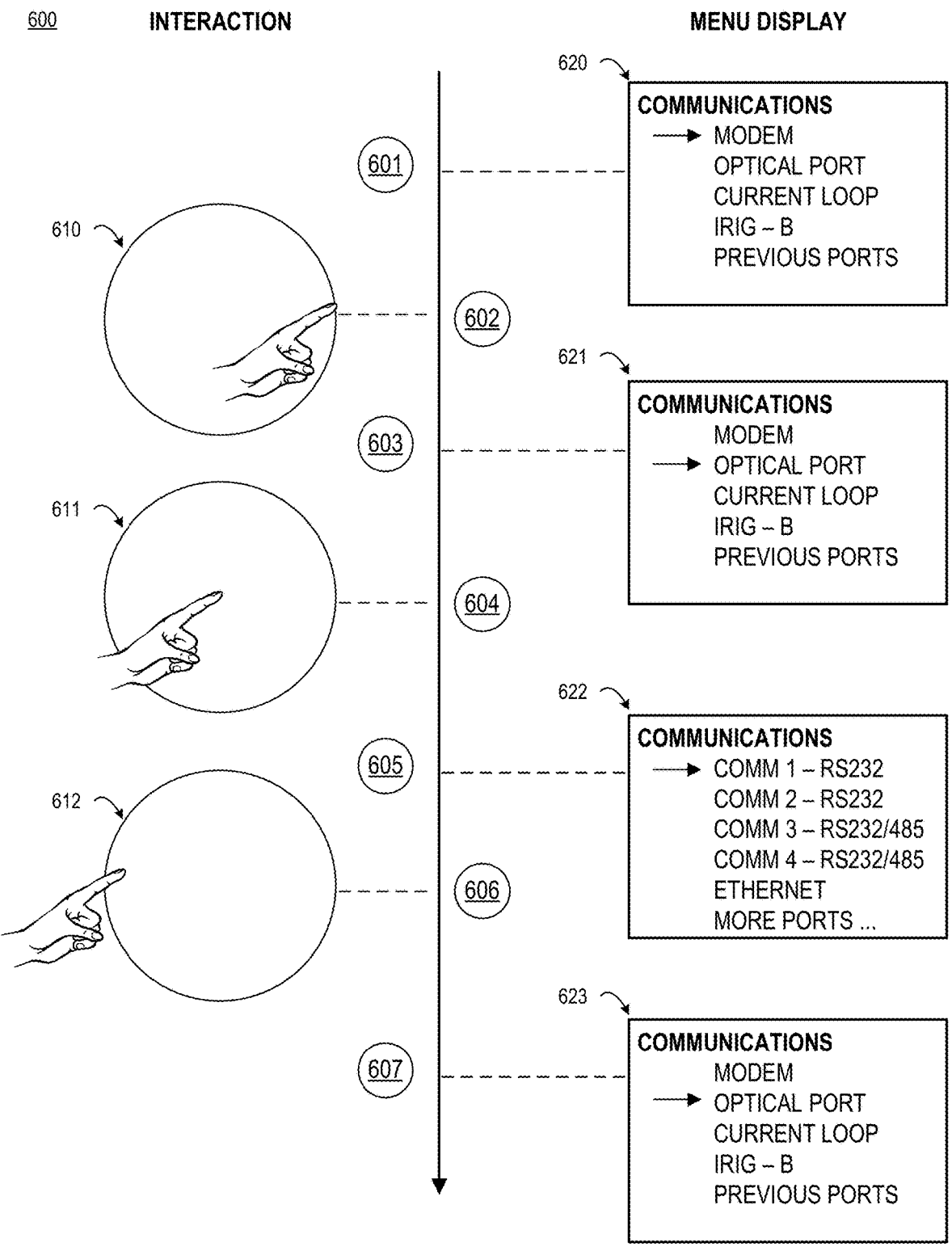
FIG. 6 depicts an exemplary use of interactions to navigate a menu of an exemplary utility meter, according to an aspect of the present disclosure.

FIG. 6 depicts an exemplary use of interactions to navigate a menu of an exemplary utility meter, according to an aspect of the present disclosure. FIG. 6 depicts timeline 600, which includes events 601-607, interactions 610-613, and menus 620-624.

At event 601, utility meter 300 displays menu 500. As can be seen, an arrow indicates the object "MODEM" within the menu 620. "MODEM" is the selected object if a selection is made.

At event 602, a user performs interaction 610, which is a tap on a right side of utility meter 300. At event 603, in response, utility meter 300 updates the display to display menu 621, which shows the object "OPTICAL PORT" as indicated by an arrow.

At event 604, the user performs interaction 611, which is a tap on the center of utility meter 300. At event 605, in response, utility meter 300 updates the menu to the "COMM 1-RS232" sub menu.

At event 606, the user performs interaction 612, which is a tap on the left side of utility meter 300.

At event 607, in response, utility meter 300 updates the menu to menu 623, which again shows the "COMMUNICATIONS" menu with the "OPTICAL PORT" object indicated as next for selection.

The process described in FIG. 6 can continue as the user navigates backward or forward through the menus. In some cases, utility meter 300 can start a timer after a last user input was received. If no input response is received after a predetermined amount of time, e.g., when the timer expires, then the utility meter can revert to the locked user input state.

GENERAL CONSIDERATIONS

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method of navigating a user interface of a utility meter, the method comprising:
 while in a locked user input state:
  receiving a first accelerometer measurement and remaining in the locked user input state;
  transitioning from the locked user input state into an unlocked user input state based on detecting a sequence of unlocking techniques including detecting removal of a cover of the utility meter in combination with determining that there is an optical connection between an optical port of the utility meter and an external device;
 while in the unlocked user input state:
  displaying, on a display of a utility meter, a menu that comprises a plurality of objects;
  receiving, from an accelerometer, a second acceleration measurement that represents three-dimensional movement;
  comparing the second acceleration measurement to an expected user input, wherein the expected user input is associated with an interaction with a selected surface of the utility meter and is based on the displayed menu; and
  when the second acceleration measurement corresponds to the expected user input, selecting an object from the plurality of objects.

2. The method of claim 1, wherein transitioning to the unlocked user input state further comprises:
 receiving, from the accelerometer, an additional acceleration measurement that represents an additional three-dimensional movement;
 comparing the additional acceleration measurement to an expected unlock user input, wherein the expected unlock user input is associated with an additional interaction with the utility meter and is different from the expected user input; and
 identifying a match between the additional acceleration measurement and the expected unlock user input.

3. The method of claim 1, wherein transitioning to the unlocked user input state further comprises:
 receiving, from a magnetic sensor and for a time threshold, a magnetic sensor signal indicating that a magnetic field has been applied to an exterior of the utility meter; and
 determining when the time threshold has lapsed.

4. The method of claim 1, further comprising, subsequent to displaying the menu:
 starting a timer; and
 when a value of the timer is greater than a threshold, configuring the utility meter in the locked user input state.

5. The method of claim 1, further comprising:
 receiving, from the accelerometer, an additional acceleration measurement that represents three-dimensional movement;
 comparing the additional acceleration measurement to an additional expected user input, wherein the additional expected user input is associated with an additional interaction with an additional surface of the utility meter, wherein the additional surface differs from the selected surface; and
 when the additional acceleration measurement corresponds to the additional expected user input, updating the display of the utility meter to an additional menu.

6. The method of claim 1, wherein transitioning to the unlocked user input state further comprises:
 receiving, on a radio of the utility meter, a signal from a mobile device.

7. A utility meter comprising:
 an accelerometer configured to measure three-dimensional movement and attached to the utility meter;
 a display;
 a processor configured to perform operations comprising:
  while in a locked user input state:
   receiving a first accelerometer measurement and remaining in the locked user input state;
   transitioning from the locked user input state into an unlocked user input state based on detecting a sequence of unlocking techniques including detecting removal of a cover of the utility meter in combination with determining that there is an optical connection between an optical port of the utility meter and an external device;
  while in the unlocked user input state:
   displaying, on the display, a menu that comprises an object;
   receiving, from the accelerometer, a second acceleration measurement;
   comparing the second acceleration measurement to an expected user input, wherein the expected user input is associated with an interaction with a selected surface of the utility meter and is based on the displayed menu; and when the second acceleration measurement corresponds to the expected user input, updating the displayed menu to indicate a user selection of the object and updating the display by navigating the menu to indicate the selected object.

8. The utility meter of claim 7, wherein transitioning to the unlocked user input state further comprises:
receiving, from the accelerometer, an additional acceleration measurement that represents an additional three-dimensional movement;
comparing the additional acceleration measurement to an expected unlock user input, wherein the expected unlock user input is associated with an additional interaction with the utility meter and is different from the expected user input; and
identifying a match between the additional acceleration measurement to the expected unlock user input.

9. The utility meter of claim 7, further comprising a magnetic sensor, wherein transitioning to the unlocked user input state further comprises:
receiving, from the magnetic sensor and for a time threshold, a magnetic sensor signal indicating that a magnetic field has been applied to an exterior of the utility meter; and
determining when the time threshold has lapsed.

10. The utility meter of claim 7, the operations further comprising, subsequent to displaying the menu:
starting a timer; and
when a value of the timer is greater than a threshold, configuring the utility meter in the locked user input state.

11. The utility meter of claim 7, the operations further comprising:
receiving, from the accelerometer, an additional acceleration measurement that represents three-dimensional movement;
comparing the additional acceleration measurement to an additional expected user input, wherein the additional expected user input is associated with an additional interaction with an additional surface of the utility meter, wherein the additional surface differs from the selected surface; and
when the additional acceleration measurement corresponds to the additional expected user input, updating the display of the utility meter to an additional menu.

12. The utility meter of claim 7, further comprising a cover removal switch configured to detect whether a cover of the utility meter is attached or removed, and wherein the processor is configured to:
receive, from the cover removal switch, an indication that the cover is removed.

13. A non-transitory computer-readable storage medium that stores computer-executable program instructions, wherein when executed by a processing device, the computer-executable program instructions cause the processing device to perform operations comprising:
while in a locked user input state:
receiving a first accelerometer measurement and remaining in the locked user input state;
transitioning from a locked user input state into an unlocked user input state based on detecting a sequence of unlock techniques, wherein the unlock techniques include (i) determining that there is an optical connection between an optical port of a utility meter and an external device and (ii) detecting actuation of a cover removal switch;
while in the unlocked user input state:
displaying, on a display of the utility meter, a menu that comprises a plurality of objects;
receiving, from an accelerometer, second acceleration measurement that represents three-dimensional movement;
comparing the second acceleration measurement to an expected user input, wherein the expected user input is associated with an interaction with a selected surface of the utility meter and is based on the displayed menu; and
when the second acceleration measurement corresponds to the expected user input, selecting an object from the plurality of objects on the displayed menu.

14. The non-transitory computer-readable storage medium of claim 13, wherein the sequence of unlock techniques includes an expected user input and transitioning to the unlocked user input state comprises:
receiving, from the accelerometer, an additional acceleration measurement that represents an additional three-dimensional movement;
comparing the additional acceleration measurement to the expected unlock user input, wherein the expected unlock user input is associated with an additional interaction with the utility meter and is different from the expected user input; and
identifying a match between the additional acceleration measurement to the expected unlock user input.

15. The non-transitory computer-readable storage medium of claim 13, wherein the sequence of unlock techniques further includes receiving, on a radio of the utility meter, a signal from a mobile device.

16. The non-transitory computer-readable storage medium of claim 13, wherein transitioning to the unlocked user input state further comprises:
receiving, from a magnetic sensor for a time threshold, a magnetic sensor signal indicating that a magnetic field has been applied to an exterior of the utility meter; and
determining when the time threshold has lapsed.

17. The non-transitory computer-readable storage medium of claim 13, the operations further comprising, subsequent to displaying the menu:
starting a timer; and
when a value of the timer is greater than a threshold, configuring the utility meter in the locked user input state.

18. The non-transitory computer-readable storage medium of claim 13, the operations further comprising:
receiving, from the accelerometer, an additional acceleration measurement that represents three-dimensional movement;
comparing the additional acceleration measurement to an additional expected user input, wherein the additional expected user input is associated with an additional interaction with an additional surface of the utility meter, wherein the additional surface differs from the selected surface; and
when the additional acceleration measurement corresponds to the additional expected user input, updating the display of the utility meter to an additional menu.

* * * * *